United States Patent

Nourse et al.

[11] Patent Number: 5,984,499
[45] Date of Patent: *Nov. 16, 1999

[54] METHOD AND APPARATUS FOR A NUMERICAL CONTROL SYSTEM FOR PROCESSING MULTIPLE JOB STREAMS

[75] Inventors: Bruce E. Nourse, Ann Arbor, Mich.; Charles S. Hutchins, N. Palm Beach, Fla.

[73] Assignee: Manufacturing Data Systems, Inc., Ann Arbor, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/928,089

[22] Filed: Sep. 12, 1997

[51] Int. Cl.$^6$ .................................................. G06F 19/00
[52] U.S. Cl. ...................... 364/134; 364/474.11; 709/107
[58] Field of Search .......................... 364/474.11, 474.31, 364/131–135, 474.15; 395/670–678, 378; 711/147–153; 707/104

[56] References Cited

U.S. PATENT DOCUMENTS

| | | | |
|---|---|---|---|
| 5,113,502 | 5/1992 | Merrill et al. | 395/672 X |
| 5,291,416 | 3/1994 | Hutchins | 364/474.11 X |
| 5,742,824 | 4/1998 | Kosaka | 395/677 X |
| 5,796,986 | 8/1998 | Fuller | 395/671 X |
| 5,808,432 | 9/1998 | Inoue et al. | 364/474.15 X |

*Primary Examiner*—William Grant
*Assistant Examiner*—McDieunel Marc
*Attorney, Agent, or Firm*—Harness, Dickey & Pierce, P.L.C.

[57] ABSTRACT

A software-based controller implemented on a generic computer hardware platform for dynamically allocating and controlling multiple job streams for anumerically controlling a machine tool. The software-based controller includes a first module for performing a set of first operations corresponding to a first job stream, a second module for performing a set of second operations corresponding to said first job stream, and a third module for performing a set of third operations corresponding to a second job stream. Each of the first, second and third modules are collectively defining a pointer architecture that includes a vertical data system to facilitate communication between operations in the same job stream and a horizontal data system to facilitate communication between operations in different job streams. A shared memory accessible to the first, second and third modules is further defined as having a vertical data structure associated with said vertical data system and a horizontal data structure associated with said horizontal data system. The first, second and third modules communicating through the shared memory by: (a) using the vertical data system to point operations in a common job stream to a first common shared memory location in said vertical data structure; and (b) using the horizontal data system to point operations in a different job streams to a second common shared memory location in said horizontal data structure.

41 Claims, 8 Drawing Sheets

METHOD AND APPARATUS FOR A NUMERICAL CONTROL SYSTEM FOR PROCESSING MULTIPLE JOB STREAMS

BACKGROUND OF THE INVENTION

1. Technical Field:

The present invention relates to a numerical control system, and more particularly a control system that dynamically allocates and controls multiple job streams for a numerically controlled machine tool.

2. Discussion of Related Art:

Numerical control systems control physical manufacturing processes, such as metal cutting or forming operations, and involve coordinated motion control interacting with discrete digital control signals, across a variety of machine tools. Numerically controlled machine tools range from large, high end, multi (>3) axis, CNC contouring machine tools with automatic tool changers and automatic pallet loading/unloading to low end two axis lathes, two axis drills and sheet metal punching machines. Some very large machine tools coordinate as many as four or more spindles operating simultaneously.

The central feature of these numerical control systems and their controlled machine tools is a part program (as opposed to a computer program). This program may control all of a sequence of operations including, but not limited to, part loading and unloading, tool selection and changing, spindle speed and feed rate control, and all of the cutting motions required to manufacture a given part. Paramount to the future of these machine tools is the ability to adapt. To do so, they must be able to: utilize current electronic technology; accommodate unplanned (when they were being designed and built) additional requirements; and incorporate new ideas which, when implemented, give the machine tool features and capabilities not planned or understood at the time the machine tool was purchased.

A "black box" controller comprised many proprietary hardware circuits that describes the motion and related machining activities to be performed. The controller supplies control signals (i.e., digital or low voltage DC signals), such that there is one signal for each axis of motion. The control signal is fed to a servo device, a type of amplifier that boosts the control signal to the level required for driving the axis motor. A typical axis motor might require a voltage on the order of 220 to 440 volts 3 phase in a large system. The axis motor in turn drives an axis or motion of the machine tool that is ultimately coupled to the tool being controlled. A feedback device (i.e., encoder) may integrate in the servo motor device or attach to the axis or motion to provide a feedback signal to the controller. The feedback device provides the controller with information about the actual position of the axis or motion so that the controller can make automatic corrections if the axis or motion deviates from its commanded position. When feedback is used, the system is said to have a closed loop control.

The first controllers were constructed using discrete transistorized circuits. With advancing technology, many of these dedicated discrete circuits were replaced first by mini computers, then by micro computers. Market leaders in the area of microcontrollers have employed a business strategy that has been to maintain the "black box" controller as a proprietary technology. Although the customer supplies the numerical control part program (describing the desired motion and ancillary machining activities), the customer is given limited documentation and access to on the internal workings of the controller. The proprietary strategy allows the controller manufacturer to require the customer to purchase all of the peripheral components from that manufacturer. These proprietary hardware solutions may use circuits with DSP chips that are programmed in firmware (i.e., burned into EPROMs) to handle the real time computational-intensive tasks.

Accordingly, a need exists for a software-based numerical control system using off the shelf generic computing hardware such as a PC. It is a hardware independent solution that enables multiple job streams to be dynamically allocated, thus affording considerable flexibility in system configuration. Although other existing systems may also be capable of running multiple job streams, these other systems have no means of dynamically allocating the number of multiple job streams to suit the specific configuration dictated by the user. Rather, conventional hardware based numerical control systems are pre-configured to run a fixed number of multiple job streams, and this number cannot be reconfigured without changing the hardware. A software-based controller allows job streams to be added or removed programmatically at start up time, based on the system requirements dictated by the user. Dynamically allocated multiple job streams give the software architecture a number of advantages. The architecture is extremely scalable. Additional job streams can be added at configuration time, without any preset or hard coded limit. The only apparent limit on the number of job streams is that dictated by the available [RAM] memory, the processing capacity of the CPU, or the data throughput of the input/output bus. Thus, a software architecture that dynamically allocates job streams can take advantage of newer, faster processors or larger memories without requiring any modifications to the system software. In addition, it is desirable that software-based controllers use commercially available real time operating systems that run on Intel or other common computing platforms. Finally, this architecture allows software-based numerical controllers to exist just as any other node or computer on a LAN or other company wide network.

SUMMARY OF THE INVENTION

The present invention is a software-based computer implemented apparatus for numerically controlling a machine tool. The apparatus includes a first module for performing a set of first operations corresponding to a first job stream, a second module for performing a set of second operations corresponding to said first job stream, and a third module for performing a set of third operations corresponding to a second job stream. Each of the first, second and third modules are collectively defining a pointer architecture that includes a vertical data system to facilitate communication between operations in the same job stream and a horizontal data system to facilitate communication between operations in different job streams. A shared memory accessible to the first, second and third modules is further defined as having a vertical data structure associated with said vertical data system and a horizontal data structure associated with said horizontal data system. The first, second and third modules communicating through the shared memory by: (a) using the vertical data system to point operations in a common job stream to a first common shared memory location in said vertical data structure; and (b) using the horizontal data system to point operations in a different job streams to a second common shared memory location in said horizontal data structure.

BRIEF DESCRIPTION OF THE DRAWINGS

Additional advantages and features of the present invention will become apparent to those skilled in the art upon reading the following detailed description and upon reference to the drawings in which.

DETAILED DESCRIPTION OF THE PREFERRED EMBODIMENT

The following description of the preferred embodiment is merely exemplary in nature and is no way intended to limit the invention or its application or its uses. Moreover, the following description, while depicting a software architecture for controlling the motion of a numerically controlled machine tool, it is intended to adequately teach one skilled in the art to make and use a software architecture that would apply in any generalized process control application.

Figure 1:
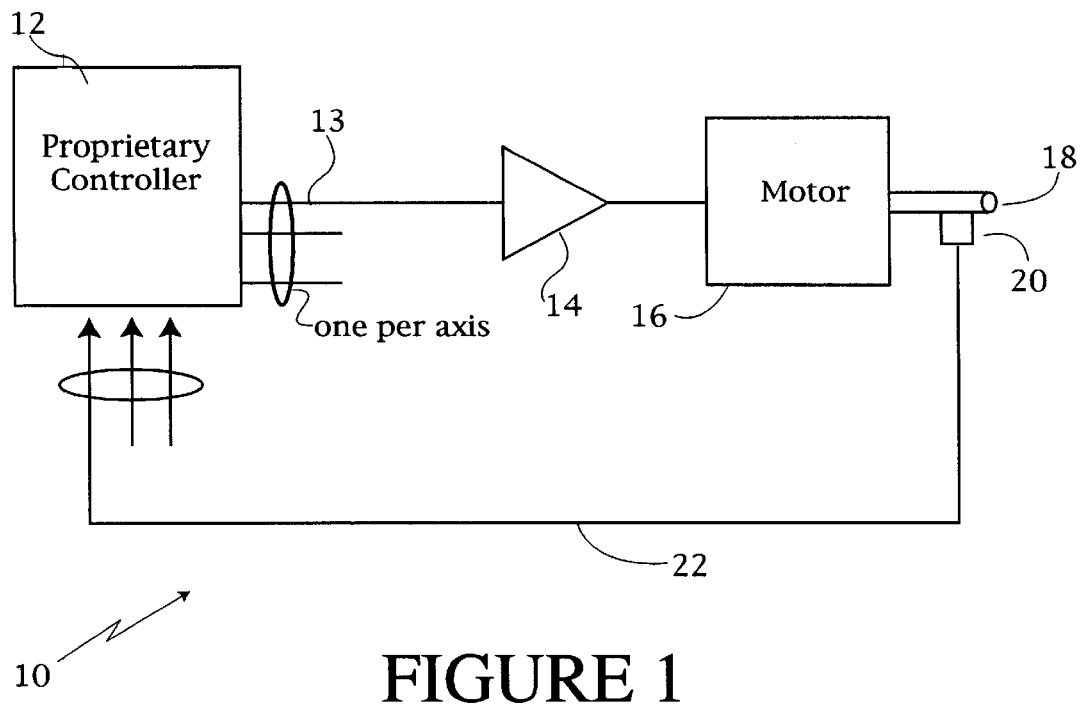
FIG. 1 is a diagram showing the system components for supporting numerical control systems in the prior art.

FIG. 1 shows a basic component of the prior art numerical control system 10 used for controlling the motion of one axis of a numerically controlled machine tool. A proprietary hardware based controller 12 will send a control signal 13 for each axis of motion employed in the numerical control system 10. A servo controller or device 14 for each axis of motion (only one is shown) is coupled to the controller 12. The control signal 13 sent by the controller 12 is amplified by the servo device 14 to a level required (if any) for driving an axis motor 16. The axis motor 16 in turn drives the axis or motion 18 that is coupled to the fixture or tool being controlled by the system 10. A feedback device 20 is attached to the axis or motion 18 to provide a feedback signal 22 to the controller 12. The feedback device 20 provides the controller 12 with information about the actual position of the axis or motion 18, so that the controller 12 can make automatic corrections if the axis or motion drifts from its commanded position.

Figure 2:
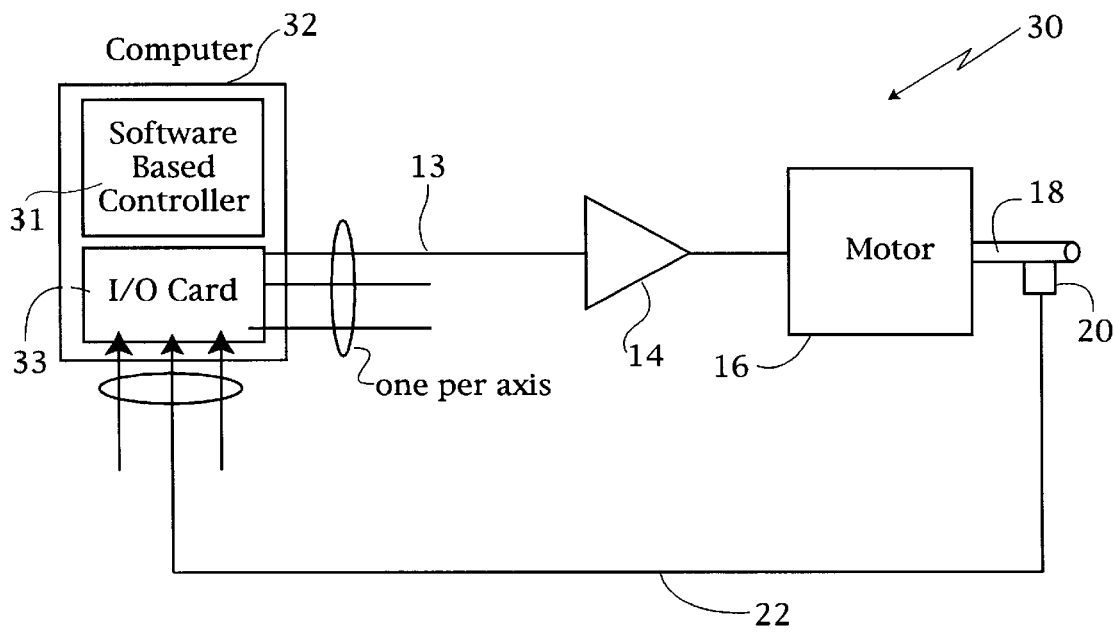
FIG. 2 is a diagram showing the system components for supporting numerical control systems in the present invention.

As shown in FIG. 2, a software-implemented numerical control system 30 is employed in the present invention. Similar to the prior art control system 10, the present invention includes a servo device 14, an axis motor 16 coupled to an axis or motion 18, and a feedback device 20 for generating a feedback signal 22. However, a proprietary hardware controller has been replaced by a computer 32 employing a software-based CNC controller 31. The computer 32, such as a PC, serves as the system controller and is equipped with one of several, off-the-shelf generic input/output cards 33 that supplies a control signal (either analog or digital) to the servo device 14, as well as receives similar signals from other feedback devices 20, such as feedback device 20. Therefore, no proprietary hardware is used in the present invention.

Figure 3:
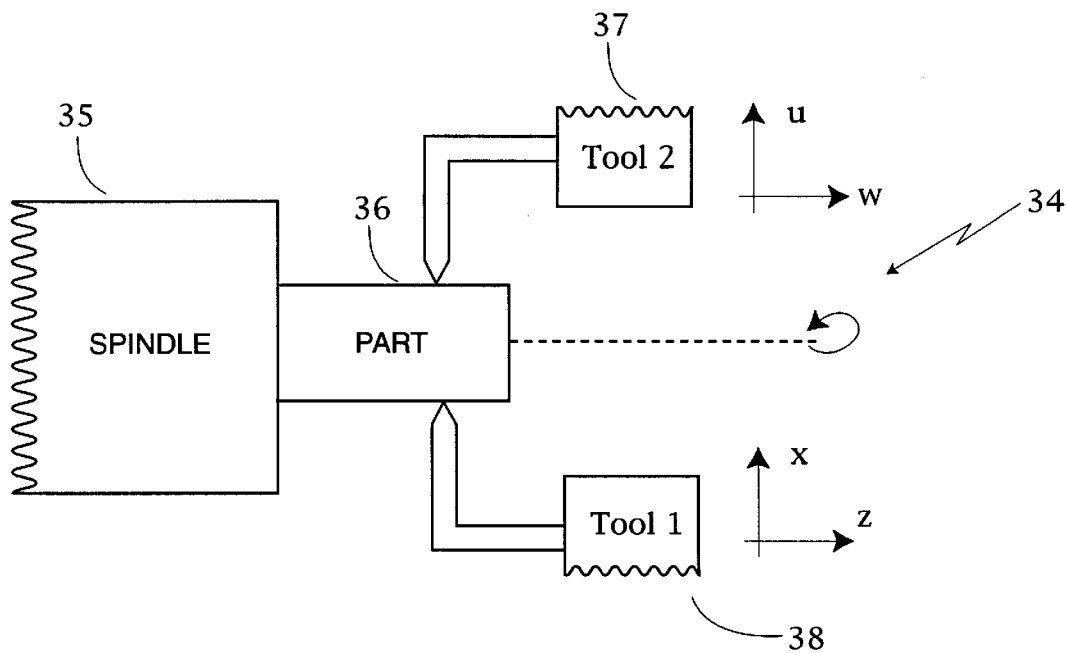
FIG. 3 illustrates a portion of a numerically controlled 4 axis lathe machine using two tools in the manufacturing process.

A software implemented control system can support dynamically allocated multiple job streams. A job stream represents an asyncronous single processing task, and the ability to run multiple job streams allows a numerically controlled machine tool to perform multiple tasks concurrently. FIG. 3 illustrates a portion of a numerically controlled machine tool 34, such as a typical 4 axis lathe, utilizing multiple job streams. A spindle 35 may engage a part 36 that is to be manufactured by the machine tool 34. As the part 36 rotates around an axis, the physical motion a first tool 37 and a second tool 38 is being controlled by the numerical control system. Numerical control tasks used to control the physical motion of one tool constitute a single job stream, such that two job streams are required to support the two tools shown in FIG. 3. Additional devices integrated with the machine tool such as tool changer, pallet changer and parts loaders may act in additional job streams.

Figure 4:
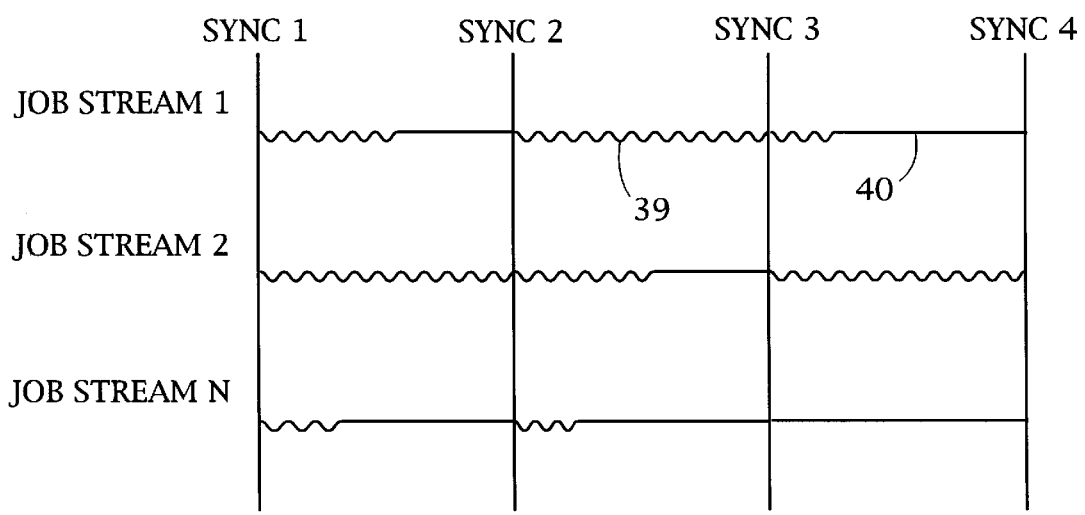
FIG. 4 shows synchronization of at least two job streams at different break/synch points.

Current numerical control systems use additional hardware to accommodate multiple job streams. Moreover, supporting communication between more than two hardware controllers can be a very complex task that results in an inflexible control system. A software-implemented control system enables asynchronously running job streams to be easily synchronized and configured. Synchronizing multiple job streams at appropriate break or synch points is illustrated in FIG. 4. Since job streams are run asynchronously 39 (i.e., each job stream cycles through its operating steps at a rate independent of the other job streams), the software architecture defines a wait state command that can be interposed in the job stream code to cause that job stream to wait 40 until one or more other job streams catch up with it. Thus, multiple job streams are able to synchronize at the break points because each job stream—although separate from and asynchronous with respect to the other job streams—is aware of what the other job streams are doing. By using shared memory and a messaging system, each job stream is able to monitor the active data set of the other job streams to determine when those other job streams are waiting for a job still running.

Figure 5:
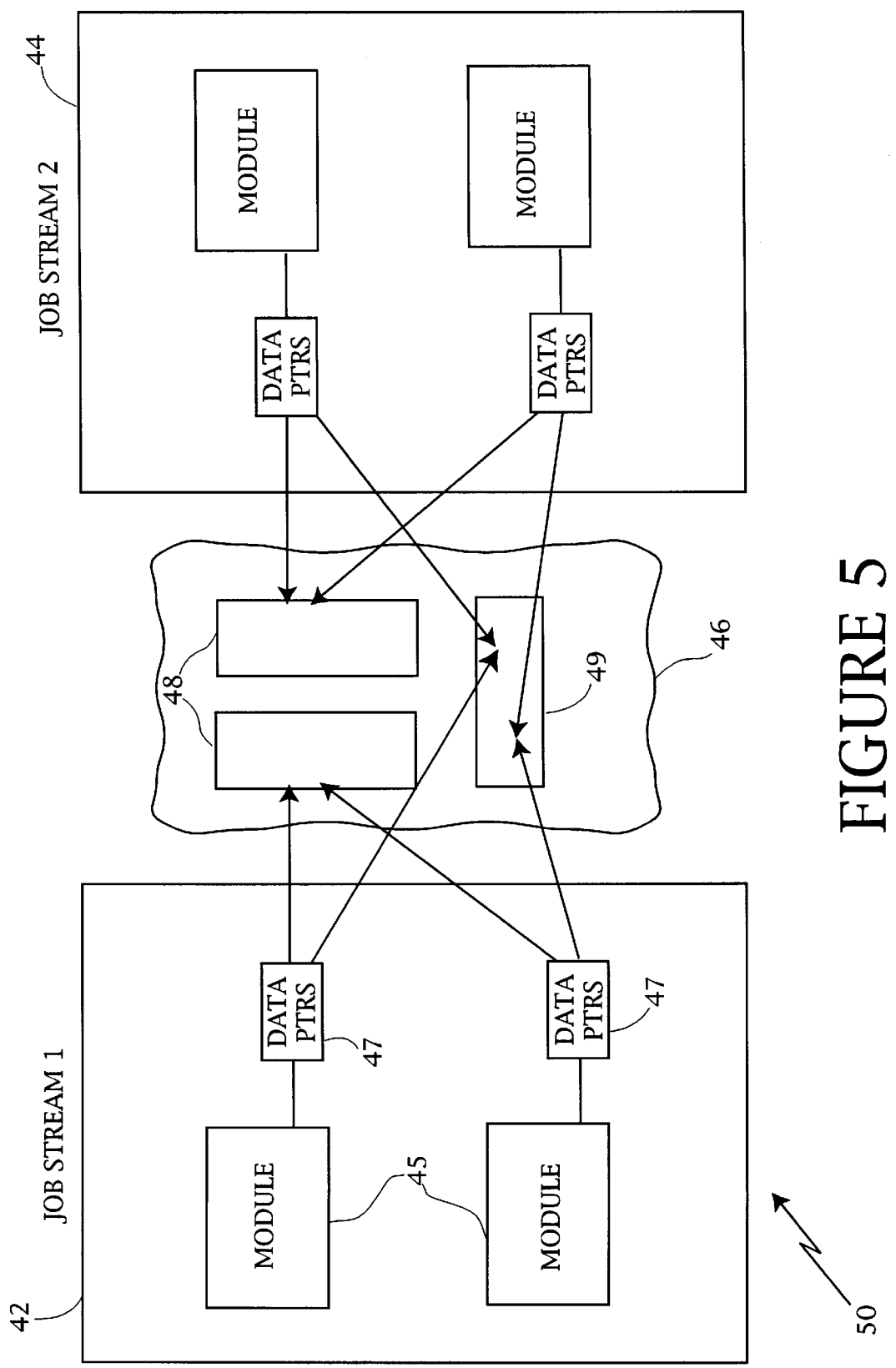
FIG. 5 is a block diagram showing the basic elements of a computer-implemented system in the present invention.

In the present invention, the software architecture 50 employs a shared memory to communicate between job streams. FIG. 5 shows the basic components for supporting the software architecture 50, including a first job stream 42 and a second job stream 44, such that each job stream represents a computer process for controlling an activity of the numerically controlled machine tool. A shared memory 46 is accessible by application modules 45 in both the first job stream 42 and the second job stream 44 for communicating control data. The shared memory 46 may be further defined as a vertical data structure 48 for storing control data that is (vertically) exchanged within either job stream, and a horizontal data structure 49 for storing control data that is (horizontally) exchanged between the first job stream 42 and the second job stream 44. Additional job streams configured by the user at startup, will also use the horizontal data structure 49 and define additional vertical data structures 48 for each such job stream. The shared memory 46 serves as a "real time" database, such that information needed for handling all rapidly occurring control functions are stored in this data structure. Data pointers 47 with addresses to physical memory are used by the first job stream 42 and the second job stream 44 because pointers 47 can access stored information in a single computer instruction. Access through pointers 47 makes the system very fast, allowing control over real time operations that would not be possible if other more computationally-intensive memory addressing techniques were used.

Figure 6:
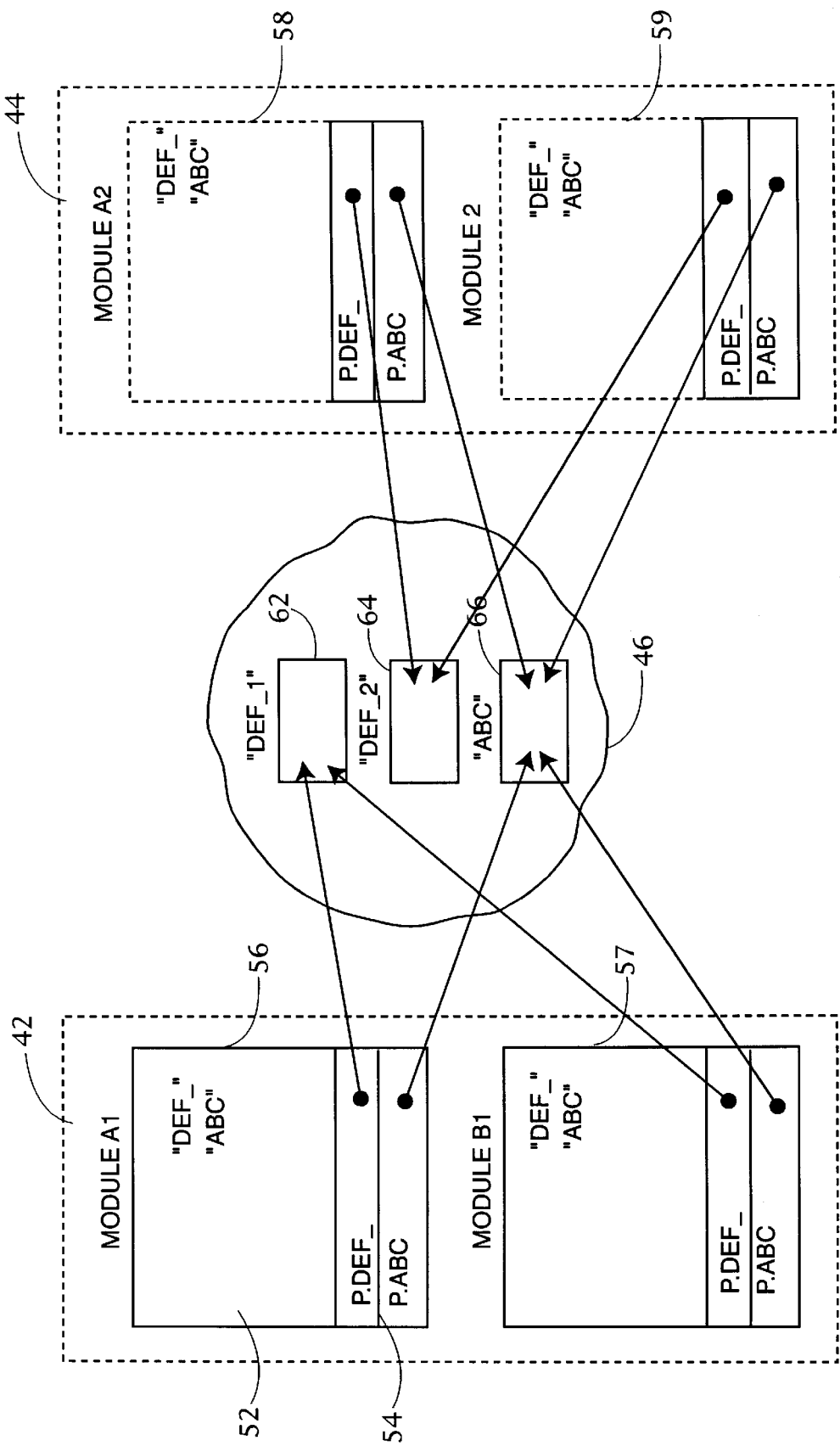
FIG. 6 is a functional diagram showing how application programs use pointers to access a real time database in the form of shared memory.
Figure 7:
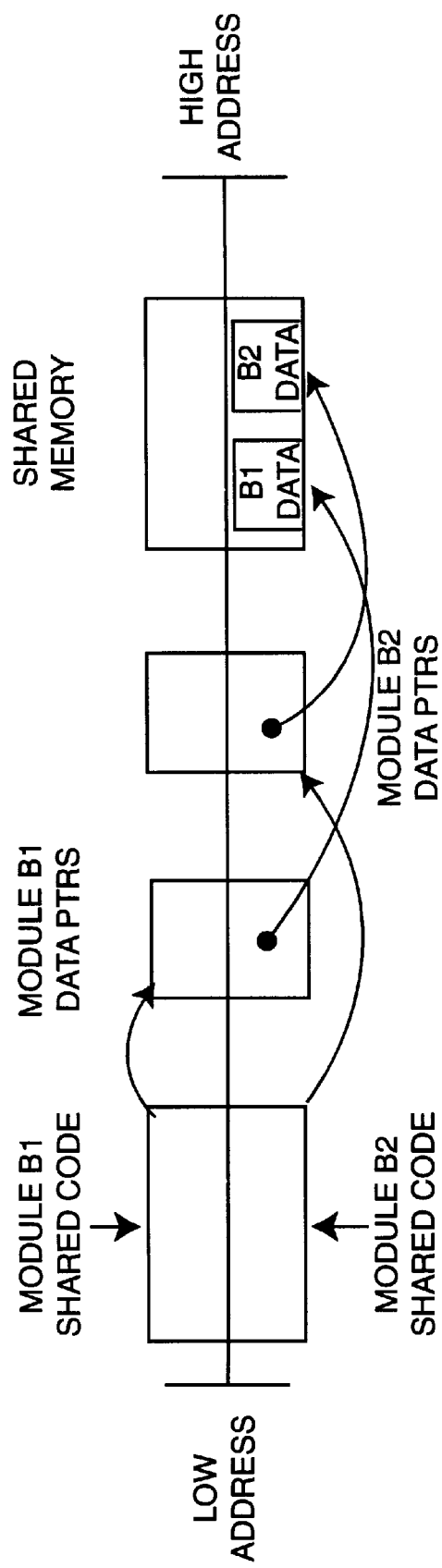
FIG. 7 illustrates how two application programs executing identical source codes are laid out in physical memory.

A job stream in the present invention will consist of at least one computer (application) module running on at least one (and as few as one) general purpose computers for executing numerical control tasks. FIG. 6 shows in more detail how application modules use pointers to access the shared memory. Each application module is logically subdivided to include its execution code 52 and its associated data storage area 54. When two instances of identical execution code are executed by two different job streams each uses the same variable location to access shared memory. However, as seen in FIG. 7, each module's respective local data structure has different assigned pointers, and thus different access points within physical memory.

Returning to FIG. 6, two different application modules in the same job stream will access the same memory address in shared memory by using the same variable name within the source code. To illustrate, first job stream 42 has been further defined as having module A1 56 and module B1 57. During execution, module A1's use of variable "DEF__" will reference a pointer value (P.DEF__) stored in module A1's local data structure. The pointer value (P.DEF__) contains a first memory address which maps to the "DEF__1" data structure 62 defined in the shared memory 46. Module A2 57 will also use the same variable "DEF__" to reference its local data structure which also maps to "DEF__1" data structure 62 through a pointer. To facilitate this data sharing, an addendum indicative of the first job stream 42 will be assigned to the data structure defined in shared memory. Similarly, application modules defined in the second job stream would access a data structure "DEF__2" 64 using the same variable "DEF__" and pointer value "DEF__". Although application modules in different job streams each utilize a variable "DEF__", the data value for this variable may be unique to their respective job stream because these vertically shared data structures and associated values will be dynamically allocated and assigned to application modules at system start up (discussed below).

Moreover, two application modules in different computer processes may also access a same memory address in shared memory. A second job stream 44 is also shown in FIG. 6 as having a module A2 58 and module B2 59. Variable "ABC" is used to illustrate horizontal sharing of data values between different job streams. Variable "ABC" references pointer value "P.ABC" which in turn maps to a memory address in shared memory. "ABC" may be an array. This is how horizontal data structures, indexed by job stream number are created. Horizontally shared data structures, such as "ABC" 66, will also be dynamically allocated and assigned to application modules at system start up. During system start up, an underscore or other indicator is used in the variable name to trigger the appropriate assignment process. Variables with an underscore indicate vertically shared data, and thus an addendum corresponding to the appropriate job stream is attached to vertical data structures defined in shared memory. On the other hand, horizontally shared data are defined without an addendum. In addition, horizontally shared data structures are essentially "globally" shared data structures in that if properly assigned at startup can be accessed by any application module. In this way, computer processes representing different job streams can share information vertically or horizontally as needed to synchronize their processing. Also note that variables that are unique to a single module, are merely stored locally in that module's local data structure.

Figure 8:
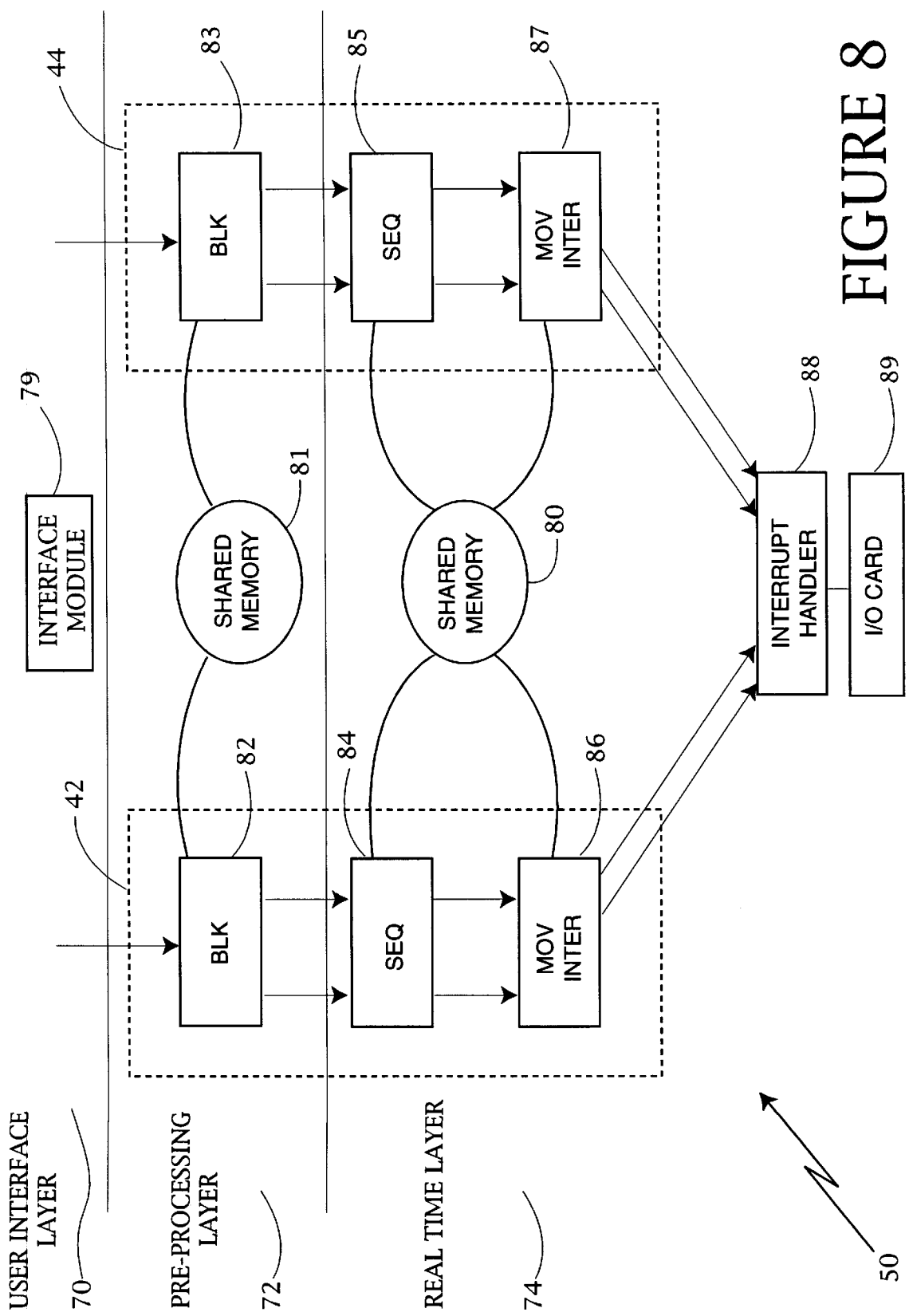
FIG. 8 is a block diagram showing a preferred embodiment a computer-implemented system in the present invention.

The preferred embodiment of the software architecture 50 for supporting a numerical control system 30 is shown in FIG. 8. The software architecture 50 will use a commercially available real time operating system that runs on a generic computing platform. The feedback signal supplied by the feedback device must be evaluated (without fail) at a very rapid rate; otherwise the servo system could drift from the desired position, causing the manufactured part to be wasted. The current embodiment closes the servo loop without fail, at a user defined rate in the range of milliseconds. The software checks actual position provided by the feedback system with the programmed position and issues compensating control signals to the servos through the generic I/O card. The servo loop for every axis is closed at every interrupt. Thus, a "real time" operating system is required to ensure that the task of evaluating the feedback signal every interrupt is never skipped. The present embodiment uses QNX®, one of several real time operating systems that are commercially available. In addition, the commercially available Microsoft® operating systems currently use a form of multitasking in which one task can (unpredictably) preempt another, and a controlled loop servo system cannot afford to be preempted. Although the current Microsoft® operating systems cannot reliably handle real time processing tasks, WindowsNT® may be upgraded or extended to handle such tasks. Those skilled in the art will appreciate that the software architecture 50 can be readily ported to WindowsNT or other various operating systems able to support real time processing tasks.

In addition, the software architecture 50 is constructed as three layers. A user interacts with the system 30 by communicating with a interface module 79 in the user interface (UI) layer 70. The UI layer 70, in turn, communicates with the pre-processing or parsing layer (also called the "near real time" layer) 72. The pre-processing layer 72 performs look-ahead computations needed to carry out the motion control tasks. Tasks assigned to the pre-processing layer 72 are those that are not absolutely real time critical. Beneath the pre-processing layer 72 is the real time layer 74. The real time layer 74 is where all time-critical tasks must be executed within an inter-interrupt interval. Using a database implementation in shared memory allows modules within a given layer to communicate with each other. For instance, a real time database 80 is defined in real time layer 74 and a near real time database 81 in defined in the pre-processing layer 72.

By having separate layers each with a database defined in shared memory, the software architecture will work in a fully distributed fashion. It is not necessary for all three layers of the architecture to physically reside on one computer or microprocessor; rather, the three layers can be distributed across multiple computers without losing any of the functionality. One advantage of this architecture is that a single user interface device could supply messages to multiple pre-processing layers, or multiple real time layers, thereby controlling multiple numerical control systems from a single user interface device simultaneously. The architecture avoids the need to send separate messages to each system, as the messaging system of the real time operating system automatically distributes the messages to the proper software entities at the designated levels.

Within each of the layers are application modules for executing numerical control tasks. In the pre-processing layer 72 is a block parser module 82 for converting part program source code into micro commands. The real time layer 74 includes a sequencer module 84 coupled to a move interpolator module 86. Functionally, the sequencer module 84 issues micro commands to the move interpolator 86, and the move interpolator module 86 supplies motion commands to an interrupt handler 88. The interrupt handler 88 is responsible for maintaining a clock used to define interrupt duration, for closing the feedback loop, and for analyzing current positioning data and calculating correction commands. The interrupt handler 88 then interfaces with the numerically controlled machine through a generic input/output card 89.

The current architecture supports multiple job streams, such that each job stream is responsible for executing a logically grouped set of control tasks and communicating with a single interrupt handler 58. In FIG. 8, a second block parser module 83, a second sequencer module 85 and a second move interpolator module 87 represent a second computer process or job stream. Multiple job streams can be instances of different programs responsible for different types of processing tasks, or can be different instances of the same programs each performing the same task but on different sets of data. In the present embodiment, there is a single interrupt handler 88 for all job streams because there is a single CPU responsible for performing the multiple physical movement tasks. One skilled in the art will appreciate that the present invention could also feature a multi-processor embodiment having multiple interrupt handlers, with some appropriate synchronization system to ensure that the physical movements are integrated.

In addition, each sequencer is shown receiving micro commands from an associated block parser in the parsing layer. However, not every sequencer must be thusly configured. In an alternative preferred embodiment, one or more sequencers can be driven by logic used in a soft PLC component. In this embodiment, third party sequential logic software is coupled to send micro commands directly to the sequencer module via an API. This software is a CASE tool editor used to create sequential logic, that is digital input/output object that defines which unique inputs and outputs are to be logically sequenced and connected to one another during configuration. The CASE tool thereafter applies these configuration rules during system operation, by monitoring the variables in the real time database. The sequential logic module is thus able to enforce system rules. It would, for example, detect if one sequencer is calling to release the work piece (i.e., part) when another sequencer is still spinning the work piece. The sequential logic module would know that it is inappropriate to release a work piece while it is still spinning, and it would therefore override the command calling for work piece release. The sequential logic module might also monitor temperature variables stored in shared memory, to activate appropriate cooling circuits, as needed. Although the current embodiment has linked to the IsaGRAF® product, this is but one example of a suitable sequential logic case tool. One skilled in the art will recognize that various such tools may be used in the present invention.

Figure 9:
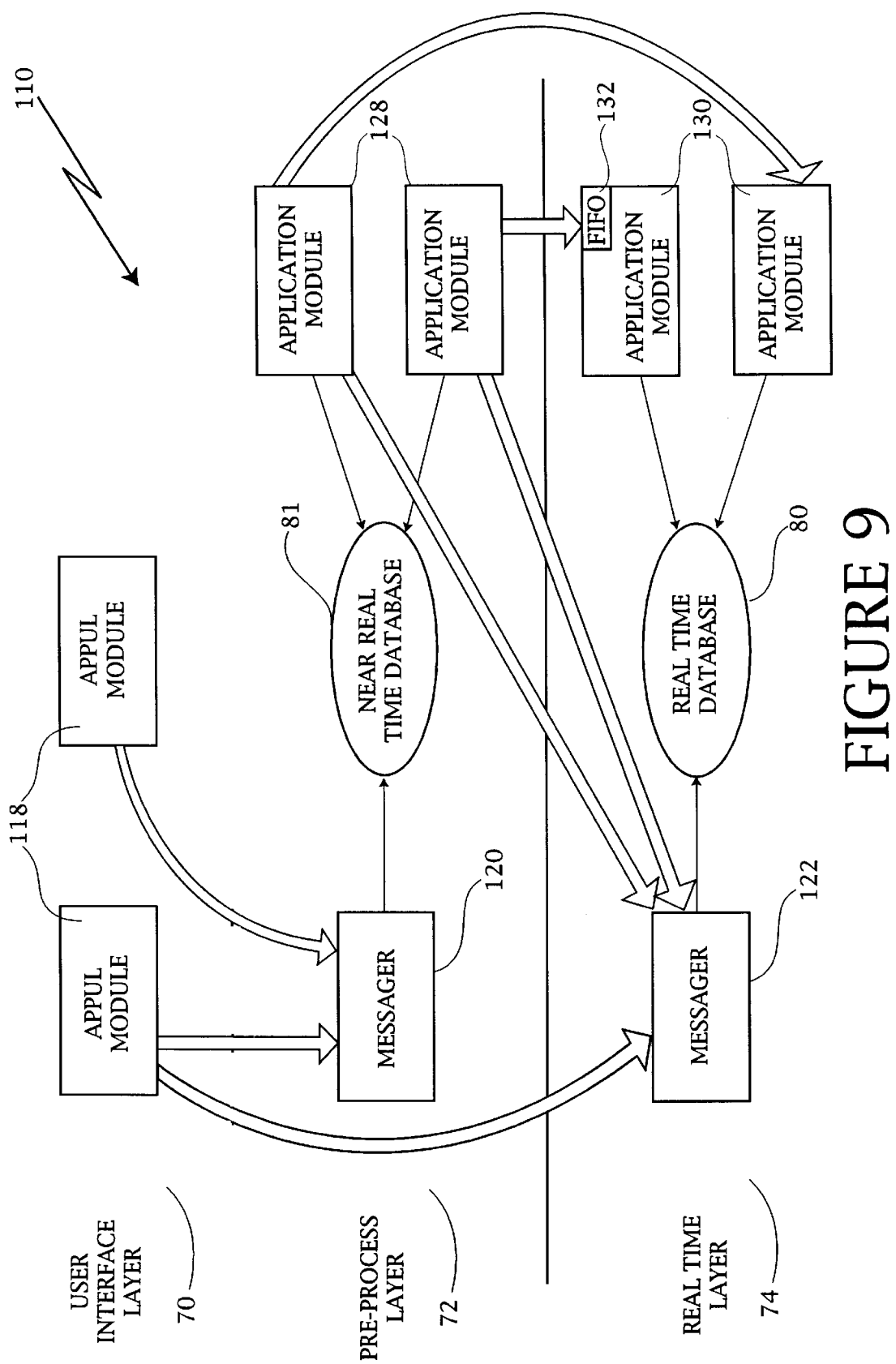
FIG. 9 is a functional diagram showing the messaging system used in the present invention.

The software architecture also provides a messaging system 110 that allows application modules to communicate with one another across layer boundaries. As shown in FIG. 9, the software architecture 50 is designed such that messages are always initiated from a higher layer to a lower layer (and not the reverse). Thus, a message (as indicated by double line arrows) can be passed from application modules 118 in the user interface (UI) layer 70 to the pre-processing layer 72, or can be passed to the real time layer 74. Similarly, a message 70 can be passed from the pre-processing layer 72 to the real time layer 74. In this context, a message is a string of ASCII characters having an agreed upon meaning. Messaging allows upper layers to communicate with lower layers. The user interacts with the UI layer through an application program 118, to input control commands into the lower layers. The messaging facility is implemented by separate message handler programs that run in each of the layers. The user, communicating through the UI layer 70, can send a message to a first message handler program 120 in the pre-processing layer 72 or to a second message handler program 122 in the real time layer 74. A message received by the message handler program 120 in the real time layer 74 will in turn decode the message and inject the proper information (as indicated by single line arrows) into the appropriate shared memory data structure. For this embodiment, a real time database 80 in the real time layer 74 and a near real time database 81 in the pre-processing layer are used as data structures. The user cannot communicate directly with either the near real time database 81 or the real time database 80, but must always send message requests through the appropriate message handler.

Furthermore, the messaging system uses a shared memory data structure to allow programs within a given layer to communicate with each other (as indicated by single line arrows). In the real time layer 74, the real time database 80 is used to pass the time-critical parameters between application programs 130 operating in the real time layer 74. Similarly, the near real time database 81 is established to allow application program(s) 128 in the pre-processing layer 72 to communicate with one another. Although programs in a given layer are able to directly read and write to the shared memory, programs in one layer cannot directly read and write into the shared memory of another layer. In addition, application program(s) can send messages across layer boundaries directly to application programs in different layer. A FIFO 132 buffer associated with an application module 130 in real time layer 74 may directly receive messages sent from an application module 128 of pre-processing layer 72. For the express purpose of supplying pre-processing events that are anticipated in the future to the real time layer 74. For example, if the motion control systems is cutting a complex shape with many corners, the pre-processing layer will look ahead to determine when an abrupt motion change will occur. It supplies information about this future event to the real time layer, so that the real time layer 74 will be instantly able to respond at every interrupt. In effect, the FIFO buffer 132 serves as a queue into which future motion control events are stored for later sequential execution. To communicate across layer boundaries, a messaging system is employed.

Thus, a software solution enables job streams to be dynamically allocated according to user specified parameters at the time of system initialization. To illustrate the advantage of the dynamically allocated multiple job stream architecture, imagine a conventional multi-tasking system in which the user initiates two copies of a brand A spreadsheet program that are each responsible for developing different data sets for feeding to an instance of a brand B spreadsheet program. Current multi-tasking systems would not be readily able to communicate data among the program instances, particularly as between brands A and B. At best, the conventional multi-tasking system would need to rely on carefully written routines in all programs that would either assemble and disassemble messages communicated through a shared communication link, or by reading and writing to data files, with suitable file format translation mechanisms at one or both ends. None of this interprogram communication would be automatic, however. Rather, it would require considerable custom programming to interface the brand A and brand B programs. This is because the brand A and brand B programs do not have a way of directly sharing each others' data sets.

Figure 10:
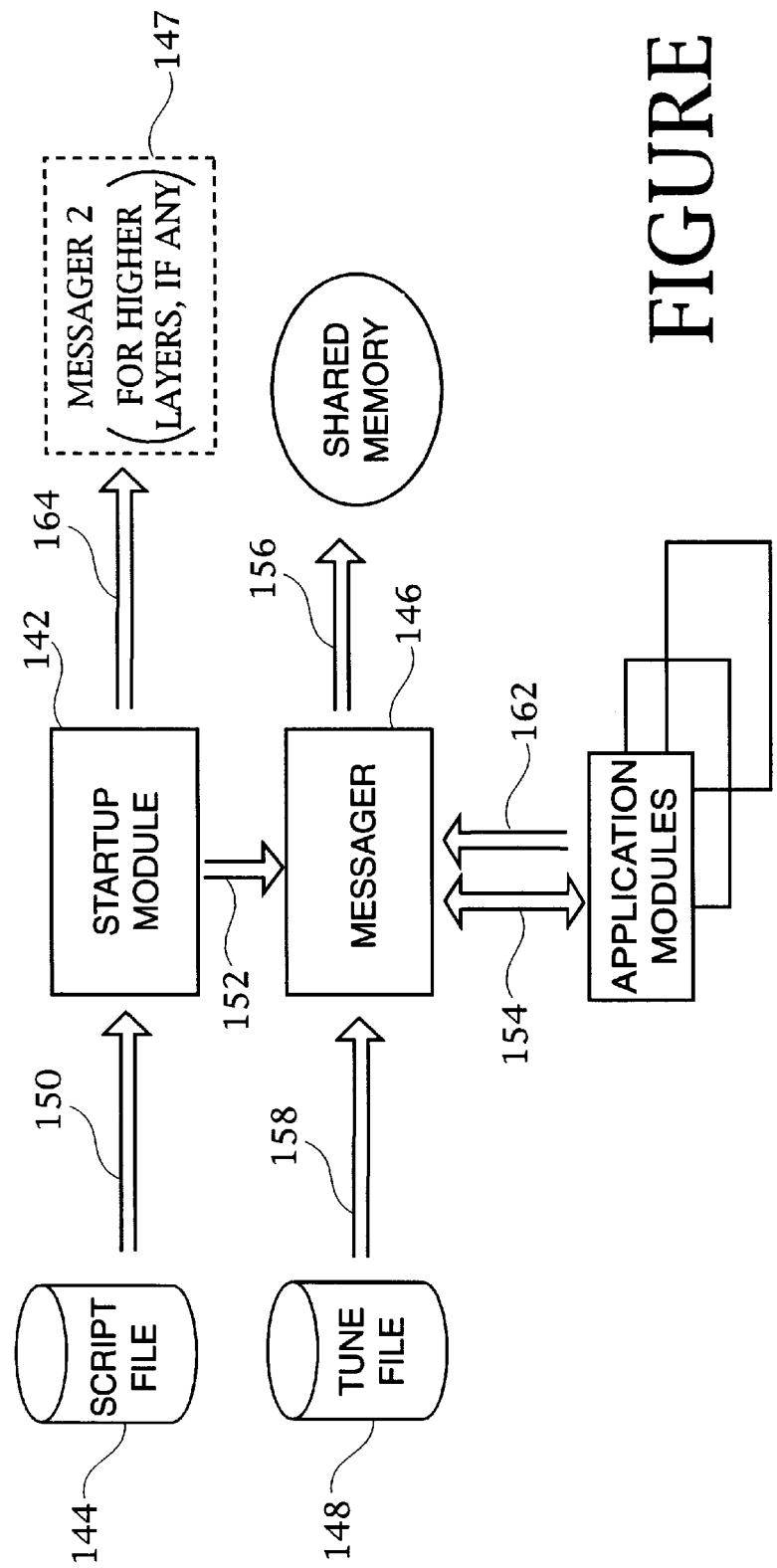
FIG. 10 is a functional diagram showing the steps for configuring and initiating the computer-implemented system in the present invention.

To overcome the above problem, the software architecture 50 employs an automatic variable and label building mechanism. The mechanism enables different job streams (such as different programs or different instances of the same program) to understand each others' memory space. The automatic variable and label building mechanism is invoked at the time of system initialization. The automatic variable and label building mechanism 140 configures the system at start up as shown in FIG. 10.

First, a startup module 142 for configuring the system is started by a user command. The startup module 142 reads in 150 a user generated script file 144. The script file 144 dictates what application modules will be initialized and what data structures will be needed by these application modules depending on the specific numeric control tasks to be performed. Using a script to configure the system, makes the system very easy to change, if new hardware or new tasks are later added to the system. For example, if the system is upgraded to support a new type of workholding system such as a pallet changer, the system configuration is easily upgraded by the user by changing the script that runs at start up.

Next, the startup module 142 initiates 152 a messager 146 that is used to facilitate communication between the startup module 142 and application modules. Based upon the script commands, execution of each application module needed for the given task is initiated 154 by the messager 146. Each application module runs the necessary preliminary steps, such that it can register program variables with the messager and then it blocks. In turn, the messager 146 determines 156 a sum representing the total memory space needed in the shared memory and shared memory is allocated appropriately. At the lowest layer, this allocated shared memory serves as the real time database. Preferably, the messager 146 will also initialize all variables allocated in memory to the null or zero state, as appropriate. Then, the messager 146 (as directed by start up module via the script file) reads 158 a list of parameters from a tune file 148 that supplies the initial values of any variables having predetermined starting values. More than one tune file 148 may be used to override default starting values specified in an earlier processed tune file.

Having allocated the shared memory and populated it with initial values from the tune file 148, the messager 144 assigns pointers into the memory space, so that each job stream may access its portion of shared memory (or another streams portion of shared memory) by reference using the pointer. Thus, each job stream has a pointer table that associates a pointer value (memory location) with each variable used by the job stream. Finally, application modules are un-blocked and each application program that will need access to registered variables, will communicate 162 with the messager 144 to get its pointer values to store in its local program data structure before beginning execution of numerical control tasks. At this point, all commands from script file have been read and the startup module is terminated. During execution, the messager controls module termination within a given layer. A stop command issued from an application module in the user interface layer and communicated to the messager will terminate processing within that layer (and possibly those layers above the terminated layer).

When the software architecture has been segmented into different layers system initialization proceeds from the bottom up. Thus, the shared memory data structure in the real time layer 74 is constructed before the shared memory data structure in the pre-processing layer 72. The startup module 142 in the real time layer 74 would startup 164 a similar second messager 147 in the pre-processing layer 72, and the above described start up procedure would be repeated. Within a given layer, programs are able to access the shared memory directly and the messager 144 or 147 respectively, handles messages sent across layer boundaries as seen in the messaging architecture (discussed above). Higher layers wishing access to the shared memory must communicate their requests through the messager. Having allocated the shared memory, the messager module retains knowledge of all pointers needed to access memory locations. Message passing with variables is communicated through index values that are also assigned at system or start up. Messages are passed between entities across layer boundaries, and thus a message is used to convey information from the UI layer to the pre-processing layer, or from the pre-processing layer to the real time layer. The index assignment mechanism works as follows.

The message receiving entity defines all commands that it is capable of understanding. These commands may be given ASCII string names. The message sending program may invoke one or more of these defined commands by passing a message to the receiving entity. At start up time, the initialization program performs a string compare upon the respective ASCII strings of the sending and receiving programs, assigning a unique integer index number to each unique match. Thus the need to communicate through ASCII names at run time is eliminated. The communicating entities simply transmit messages by sending the appropriate index numbers. Unique index numbers are assigned not only to ASCII string names, but are also used to identity of the associated job stream involved. A message involving the same ASCII command, but in different job streams, would have different assigned index numbers.

The basic architecture described above uses both message passing and shared memory to coordinate the dynamically allocated multiple job streams. The original implementation used only message passing between streams, with message passing being handled at the user configurable interrupt handling data rate. The initial approach thus placed a considerable burden on the real time portion of the system (by requiring all message passing to be handled by that system). To reduce this burden the current embodiment uses shared memory for communication between entities that have similar communication urgency requirements. Thus, entities that must coordinate in the real time layer utilize the real time database defined in shared memory.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

We claim:

1. A computer-implemented system to facilitate multiple job streams in a numerically controlled machine, comprising:

a first module for performing a set of first operations corresponding to a first job stream;

a second module for performing a set of second operations corresponding to said first job stream;

a third module for performing a set of third operations corresponding to a second job stream;

said first, second and third modules collectively defining a pointer architecture that includes a vertical data system to facilitate communication between operations in the same job stream and a horizontal data system to facilitate communication between operations in different job streams;

a shared memory accessible to said first, second and third modules, said shared memory having a vertical data structure associated with said vertical data system and a horizontal data structure associated with said horizontal data system; and said first, second and third modules communicating through said shared memory by;

(a) using said vertical data system to point from operations in a common job stream to a first common shared memory location in said vertical data structure; and (b) using said horizontal data system to point from operations in different job streams to a second common shared memory location in said horizontal data structure.

2. The apparatus according to claim 1 wherein said vertical data system includes a vertical variable referenced by said first module for mapping to a first pointer associated with said first module, whereby said first pointer maps to said first common shared memory location.

3. The apparatus according to claim 2 wherein said second module references said vertical variable for mapping to a second pointer associated with said second module, whereby said second pointer maps to said first common shared memory location.

4. The apparatus according to claim 2 wherein said first memory location is identified by a unique identifier coupled to an addendum identifier, where addendum identifier is indicative of said first job stream.

5. The apparatus according to claim 1 wherein said horizontal data system includes a horizontal variable referenced by said second module for mapping to a second pointer associated with said second module, whereby said second pointer maps to said second common shared memory location.

6. The apparatus according to claim 5 wherein said third module references said horizontal variable for mapping to a third pointer associated with said third module, whereby said third pointer maps to said second common shared memory location.

7. The apparatus according to claim 5 wherein said second common shared memory location in said horizontal data structure is further defined as an array data structure, where said horizontal variable includes an index for accessing said array data structure.

8. The apparatus according to claim 1 wherein said first module, said second module and said third module are further defined as application modules for performing numerical control tasks.

9. The apparatus according to claim 8 wherein said application modules includes an interrupt handler for interfacing with said numerically controlled machine.

10. The apparatus according to claim 9 wherein said interrupt handler must execute and complete control tasks within said interrupt interval, where said interrupt interval is a predetermined duration for monitoring feedback control signals.

11. The apparatus according to claim 10 further comprising a real time layer having at least one application module that must execute and complete numerical control tasks within said interrupt interval, and a real time database defined in shared memory and accessible by said application modules in said real time layer, where said real time database further includes said vertical data structure associated with said vertical data system and said horizontal data structure associated with said horizontal data system.

12. The apparatus according to claim 10 wherein said application modules in said real time layer includes a first move interpolator associated with a first process and a second move interpolator associated with a second process, each coupled to said interrupt handler for supplying motion commands, a first sequencer associated with said first process coupled to said first move interpolator for issuing motion commands relating to said first process, and a second sequencer, associated with said second process, coupled to second move interpolator for issuing motion commands relating to said second process.

13. The apparatus according to claim 10 further comprising a pre-processing layer having at least one application module that execute control tasks, where execution of said numerical control tasks is longer than said interrupt interval, and a near real time database defined in said shared memory and accessible by said application modules in said pre-processing layer, where said near real time database further includes said vertical data structure associated with said vertical data system and said horizontal data structure associated with said horizontal data system.

14. The apparatus according to claim 13 wherein said application modules of said pre-processing layer includes a first block parser associated with said first process coupled to said first sequencer and a second block parser associated with said second process coupled to said second sequencer, each for converting source code into motion commands.

15. The apparatus according to claim 13 wherein said application modules of said pre-processing layer includes a soft programmable logic controller component coupled to at least one of said first seqencer and said second sequencer for issuing motion commands.

16. The apparatus according to claim 13 further comprising a user interface layer having application modules for capturing user control commands and for initiating transmission of a first message to at least one of said application modules of said pre-processing layer and said application modules of said real time layer.

17. The apparatus of claim 16 wherein said application modules of said user interface layer reside on a first computing unit, and said application modules of said pre-processing layer and application modules of said real time layer reside on a second computing unit, where said first computing unit and said second computing layer are coupled by a network channel.

18. The apparatus of claim 17 wherein said application modules of said pre-processing layer includes a first messager module for at least one of receiving said first message from said application modules of said user interface layer and for accessing said near real time database.

19. A computer-implemented system to facilitate multiple job streams in a numerically controlled machine, comprising:

a first module for performing a set of first operations corresponding to a first job stream;

a second module for performing a set of second operations corresponding to said first job stream;

a third module for performing a set of third operations corresponding to a second job stream;

messenger module communicating with said first, second and third modules that implements a pointer architecture that includes a vertical data system to facilitate communication between operations in the same job stream and a horizontal data system to facilitate communication between operations in different job streams;

a shared memory accessible to said first, second and third modules and said messenger module;

said messenger module defining in said shared memory a vertical data structure associated with said vertical data system and a horizontal data structure associated with said horizontal data system; and said first, second and third modules communicating with said messenger module through said shared memory:
(a) using said vertical data system to point from operations in a common job stream to a first common shared memory location in said vertical data structure; and
(b) using said horizontal data system to point from operations in different job streams to a second common shared memory location in said horizontal data structure.

20. The apparatus of claim 19 wherein said application modules of said real time layer includes a second messenger module for receiving at least one of said first message from application modules of said user interface layer and said second message from said application modules of said real time layer, and for accessing said real time database.

21. The apparatus according to claim 20 wherein said vertical data system includes a vertical variable referenced by said first module for mapping to a first pointer associated with said first module, whereby said first pointer maps to said first common shared memory location.

22. The apparatus according to claim 21 wherein said second module references said vertical variable for mapping to a second pointer associated with said second module, whereby said second pointer maps to said first common shared memory location.

23. The apparatus according to claim 21 wherein said first memory location is identified by a unique identifier coupled to an addendum identifier, where addendum identifier indicative of said first job stream.

24. The apparatus according to claim 20 wherein said horizontal data system includes a horizontal variable referenced by said second module for mapping to a second pointer associated with said second module, whereby said second pointer maps to said second common shared memory location.

25. The apparatus according to claim 24 wherein said third module references said horizontal variable for mapping to a third pointer associated with said third module, whereby said third pointer maps to said second common shared memory location.

26. The apparatus according to claim 24 wherein said second common shared memory location in said horizontal data structure is further defined as an array data structure, where said horizontal variable includes an index for accessing said array data structure.

27. The apparatus according to claim 20 wherein said first module, said second module and said third module is further defined as application modules for performing numerically controlled tasks.

28. The apparatus according to claim 27 wherein said application modules includes an interrupt handler for interfacing with said numerically controlled machine.

29. The apparatus according to claim 28 wherein said interrupt handler must execute and complete control tasks within said interrupt interval, where said interrupt interval is a predetermined duration for monitoring feedback control signals.

30. The apparatus according to claim 29 further comprising a real time layer having application modules that must execute and control tasks with said interrupt interval, and a real time database accessible by said application modules in said real time layer and defined in shared memory and defined in said shared memory, where said real time database further includes said vertical data structure associated with said vertical data system and said horizontal data structure associated with said horizontal data system.

31. The apparatus according to claim 29 wherein said application modules in said real time layer includes a first move interpolator associated with a first process and a second move interpolator associated with a second process, each coupled to said interrupt handler for supplying motion commands, a first sequencer associated with said first process coupled to said first move interpolator for issuing motion commands relating to said first process, and a second sequencer, associated with said second process, coupled to second move interpolator for issuing motion commands relating to said second process.

32. The apparatus according to claim 29 further comprising a pre-processing layer having application modules that execute control tasks, where execution is longer than said interrupt interval, and a near real time database accessible by said application modules in said pre-processing layer and defined in shared memory, where said near real time database further includes said vertical data structure associated with said vertical data system and said horizontal data structure associated with said horizontal data system.

33. The apparatus according to claim 32 wherein said application modules of said pre-processing layer includes a first block parser associated with said first process coupled to said first sequencer and a second block parser associated with said second process coupled to said second sequencer, each for converting source code into motion commands.

34. The apparatus according to claim 32 wherein said application modules of said pre-processing layer includes a soft programmable logic controller component coupled to at least one of said first seqencer and said second sequencer for issuing motion commands.

35. The apparatus according to claim 29 further comprising a user interface layer having application modules for capturing user control commands and initiating transmission of a first message to at least one of said application modules of said pre-processing layer and said application modules of said real time layer.

36. The apparatus according to claim 35 wherein said application modules of said user interface layer reside on a first computing unit, and said application modules of said pre-processing layer and application modules of said real time layer reside on a second computing unit, where said first computing unit and said second computing layer are coupled by a network channel.

37. The apparatus according to claim 35 further comprising a startup module for implementing said pointer architecture by reading a script file and initiating said messager module, whereby based upon commands from said script file said messager module executes said application modules for registering module variables with said messager, blocking said application modules, defining said horizontal data structure and said vertical data structure in said shared memory, reading at least one tune file for setting initial module variables, assigning pointers into said shared memory, and unblocking said application modules, where said application modules get corresponding pointer values from said messager before performing said numerically controlled tasks.

38. The apparatus according to claim 35 wherein said startup module initiates a first messager module for implementing a first pointer architecture in said real time layer, and upon completing implementation of said first pointer architecture initiate a second messager module for implementing said pointer architecture in said pre-processing layer.

39. The apparatus of claim 38 wherein said second messager module of said pre-processing layer facilitates communication by at least one of receiving said first message from said application modules of said user interface layer and for accessing said near real time database.

40. The apparatus of claim 38 wherein said first messager module of said real time layer facilitates communication by receiving at least one of said first message from application modules of said user interface layer and said second message from said application modules of said real time layer, and for accessing said real time database.

41. A computer-implemented method of facilitating multiple job streams in a numerically controlled machine, comprising the steps of:

provding a first module for performing a set of first operations corresponding to a first job stream;

providing a second module for performing a set of second operations corresponding to said first job stream;

providing a third module for performing a set of third operations corresponding to a second job stream;

implementing a pointer architecture that includes a vertical data system to facilitate communication between operations in the same job stream and a horizontal data system to facilitate communication between operations in different job streams;

communicating through a shared memory accessible to said first, second and third modules, said shared memory having a vertical data structure associated with said vertical data system and a horizontal data structure associated with said horizontal data system, whereby said first, second and third modules communicate by:

(a) using said vertical data system to point operations in a common job stream to a first common shared memory location in said vertical data structure; and (b) using said horizontal data system to point operations in a different job streams to a second common shared memory location in said horizontal data structure.

* * * * *